United States Patent [19]

Baker

[11] Patent Number: 5,067,746

[45] Date of Patent: Nov. 26, 1991

[54] ANTI-THEFT TRAILER JACK AND METHOD OF USING SAME

[76] Inventor: John E. Baker, 915 S. 13th St., St. Joseph, Mo. 64503

[21] Appl. No.: 567,780

[22] Filed: Aug. 15, 1990

[51] Int. Cl.[5] .............................................. B60S 9/04
[52] U.S. Cl. .............................. 280/763.1; 280/475;
   248/552; 248/354.5; 254/419; 340/431
[58] Field of Search ................. 280/475, 763.1, 764.1,
   280/427; 248/551, 552, 352, 354.5; 254/102,
   418, 419; 340/425.5, 431; 70/258, 237

[56] References Cited

U.S. PATENT DOCUMENTS

| | | | |
|---|---|---|---|
| 1,153,223 | 9/1915 | Hendrickson | 254/418 |
| 1,548,326 | 8/1925 | McDuffie | 248/352 X |
| 1,682,856 | 9/1928 | Salkind | 248/352 X |
| 2,519,364 | 8/1950 | Fredholm | 248/352 |
| 2,595,100 | 4/1952 | Ravers, Jr. | 280/475 |
| 2,634,941 | 4/1953 | Eckert | 280/763.1 |
| 2,689,708 | 9/1954 | Havens | 248/352 X |
| 2,836,432 | 5/1958 | Delp et al. | 280/475 |
| 3,281,160 | 10/1966 | Vinther et al. | 280/475 X |
| 3,315,973 | 4/1967 | Marple | 280/475 X |
| 3,332,699 | 7/1967 | Devys | 280/763.1 X |
| 3,695,631 | 10/1972 | Schwaiger | 280/763.1 X |
| 3,791,676 | 2/1974 | Spratlen | 280/475 |
| 3,881,746 | 5/1975 | Newcomb, Jr. | 280/763.1 |
| 3,944,259 | 3/1976 | Miller | 280/475 |
| 4,397,479 | 8/1983 | Schmidt | 280/764.1 |
| 4,469,348 | 9/1984 | Crook | 280/475 |
| 4,579,382 | 4/1986 | Lake | 280/475 X |
| 4,619,463 | 11/1986 | Weaver | 280/475 |

FOREIGN PATENT DOCUMENTS

| | | | |
|---|---|---|---|
| 1039849 | 9/1958 | Fed. Rep. of Germany | 280/763.1 |
| 0931535 | 6/1982 | U.S.S.R. | 280/763.1 |

Primary Examiner—Andres Kashnikow
Assistant Examiner—Brian L. Johnson
Attorney, Agent, or Firm—Richard C. Litman

[57] ABSTRACT

An apparatus and a method of using the apparatus for supporting and immobilizing a trailer, especially a detachable trailer towed by a motor vehicle. The apparatus is attached to the trailer frame, one unit attached either in front, or behind each of the rear wheels. The apparatus is comprised of an elongated support or "jack" pivotally attached to the trailer frame and having a ground engaging foot. For travel, the support pivots to a horizontal position and is locked to the trailer frame. When the trailer is to be immobilized, the support pivots downward until it contacts the ground. The trailer is then rotated against the support by using the towing motor vehicle to tow the trailer forward against the support causing the support to pivot to its fully deployed vertical position perpendicular to the trailer frame. The trailer is now fully supported by the invention and the wheels of the trailer have been raised off the ground. The support can be locked in this vertical position. In addition to providing a stable support while the trailer is in storage or for working on or around the trailer and its contents, the supports of the invention provide anti-theft protection as the trailer cannot be moved while the supports are in their perpendicular, locked position. The invention can also be adapted for other types of land vehicles.

8 Claims, 2 Drawing Sheets

FIG. 5
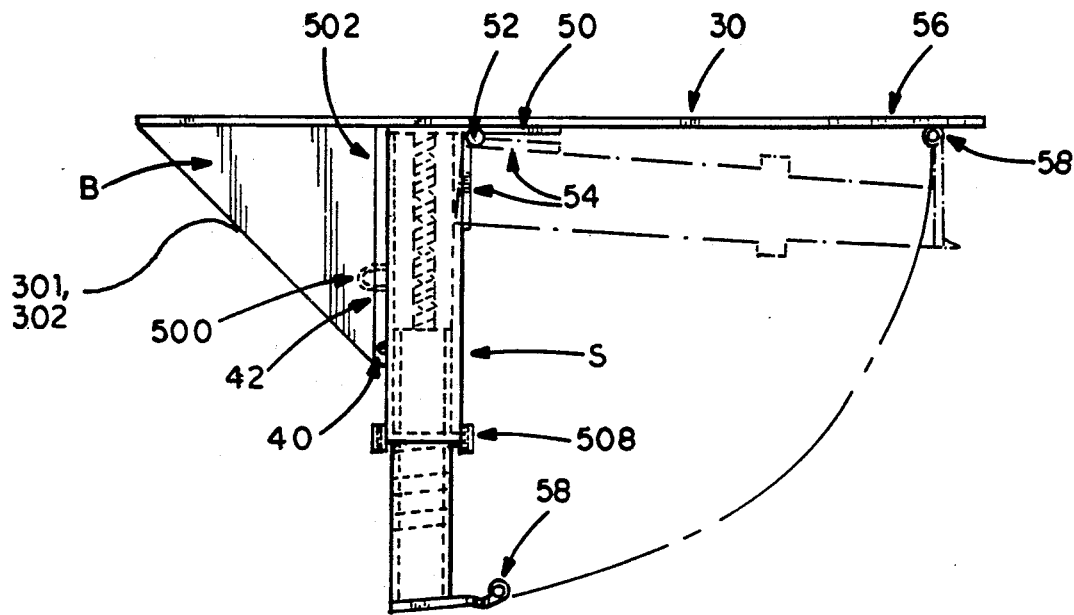
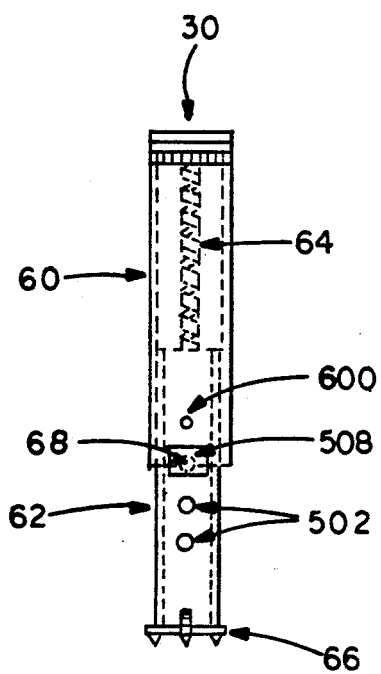
FIG. 6
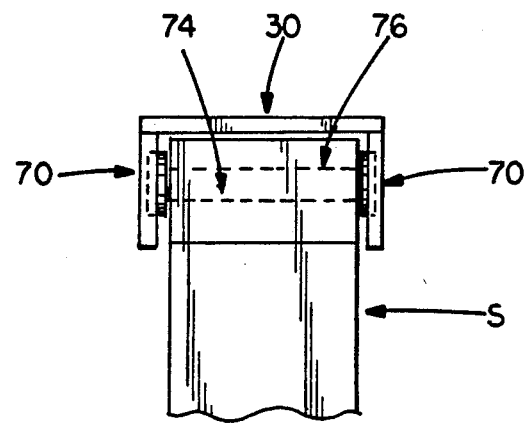
FIG. 7

1

ANTI-THEFT TRAILER JACK AND METHOD OF USING SAME

FIELD OF THE INVENTION

This invention relates to supports for trailers and other land vehicles, particularly detachable trailers, which support and immobilize the trailer by raising the trailer wheels off the ground.

BACKGROUND OF THE INVENTION

This invention relates to a special support, or "jack", to be attached to the frame of a trailer or other land vehicle. The invention is intended especially for a detachable trailer towed by a motor vehicle. One example of such a detachable trailer is a boat hauling trailer with a forwardly extending tongue, for hitching to a towing vehicle and wheels disposed to the rear for travel. A recurring problem encountered with such trailers when unattended or when detached from the towing vehicle is theft or unintended movement. Various systems have been devised as anti-theft measures for such detachable trailers but all such previous measures have generally been expensive, complex in construction, deployment and operation, and frequently unreliable.

It is known to provide supporting devices to supplement the wheels for such trailers which are deployable when the trailer is at rest. However, previous devices have been designed solely for the purpose of increased stability for the trailer at rest. Furthermore, prior art devices have required extensive time and effort to deploy.

DESCRIPTION OF THE RELATED ART

U.S. Pat. No. 3,281,160 discloses a trailer support disposed at the rear corners of a trailer. The supports are foldable to a horizontal storage position against the trailer frame and, when in operation, extend perpendicular to the frame to engage the ground. The "jack" type supports are manually extensible so that they may be used to raise the trailer wheels off the ground when the wheels or tires need to be worked on. But the method of use requires that the supports be in their ground engaging position before the trailer wheels can be raised, requiring that the device include complex gearing and further requiring considerable physical effort as the device is supporting the weight of the vehicle while being extended. Additionally, the supports are designed to collapse if an attempt is made to move the trailer. Therefore, the supports of this invention provide reduced stability and, of course, no anti-theft protection.

SUMMARY OF THE INVENTION

By the present invention an improved apparatus and method of use is provided to support a trailer. The invention is a pivotable elongated support, or "jack", attached to the trailer frame either in front or, for an extended trailer, behind the rear wheel. The support pivots, and locks to a horizontal position against the trailer frame for storage. The apparatus is designed so that the towing vehicle is used to fully deploy the support. The invention, therefore, can be basic in design and yet can be deployed expeditiously and with minimal physical effort.

For deployment, the support is unlocked from its horizontal, storage position and, thereby, allowed to drop into engagement with the ground. A ground engaging foot at the end of the support prevents the support from moving relative to the ground. The towing vehicle is then used to pull the trailer against the support causing the support to pivot to a full perpendicular position. The support now abuts a rearwardly disposed backing brace and can be locked in this position. The length of the support is such that the trailer wheels are now suspended off the ground. In another embodiment of the invention, the length of the support can be adjusted.

An electrical switch may also be provided, mounted on the backing brace of the invention. The switch is activated when the support is fully deployed, that is pivoted to its perpendicular position. The switch electrically communicates with an indicator mounted in a position on the trailer readily visible from the passenger compartment of the motor vehicle and may be connected through the trailer wiring harness. Thereby, the operator, from within the passenger compartment of the towing vehicle, will be able to ascertain when the support is fully deployed.

When the device is in its deployed position, therefore, the trailer is securely supported off its wheel and is provided with a stable base for working on or around. Additionally, the support provides an easy to deploy but highly effective anti-theft protection system as the trailer cannot be moved until the supports are unlocked from the backing brace.

The supports of the invention may also be adapted for other types of land vehicles.

Accordingly, one of the objects of the invention is to provide an improved support for a detachable trailer.

It is a further object of the invention to provide an improved support for a detachable trailer which when deployed lifts the rear wheel off the ground.

It is another object of the invention to provide a support for a detachable trailer which when deployed also provides anti-theft protection and protection against unintended movement.

It is another object of the invention to provide a trailer support which is sturdy in construction, and can be deployed expeditiously and with minimal physical effort.

It is another object of the invention to provide a trailer support which is deployed by use of the towing vehicle.

It is another object of the invention to provide an electrical indication visible from the passenger compartment of the towing vehicle when the trailer support is fully deployed.

It is another object of the invention to provide a support which can readily adapted for use with other types of land vehicles.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

FIG. 5 is a side cross-sectional view of the invention.

FIG. 6 is a front cross-sectional view of the support of the invention.

FIG. 7 is a front cross-sectional view of the second embodiment of the pivoting means for the support of the invention.

Similar reference characters designate corresponding parts throughout the several figures of the drawings.

DESCRIPTION OF THE PREFERRED EMBODIMENT

Figure 1:
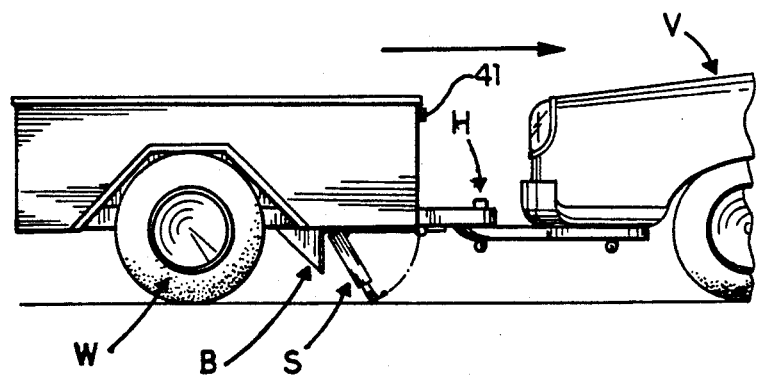
FIG. 1 is a perspective view of the invention showing the operation of the invention as mounted on a detachable trailer and in relation to a towing vehicle.
Figure 2:
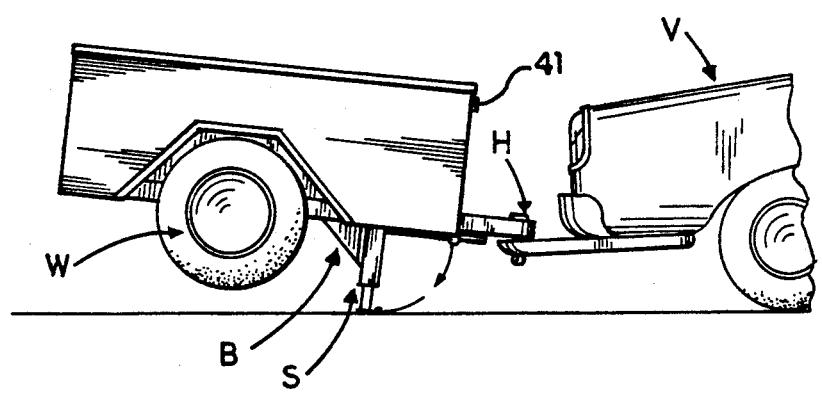
FIG. 2 is a perspective view of the invention showing the operation of the invention when rotated to its vertical ground engaging position by the towing vehicle.
Figure 3:
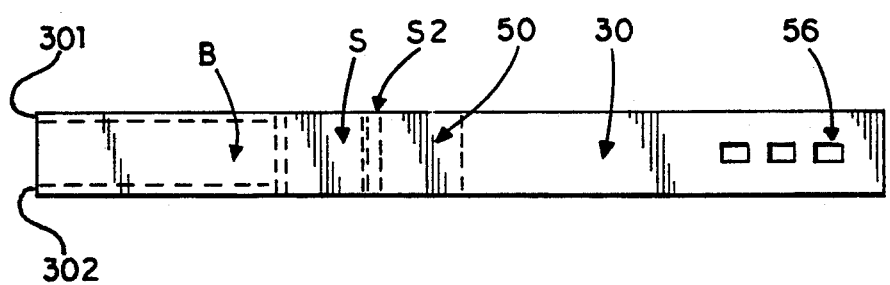
FIG. 3 is a top view of the mounting plate of the invention attached to the trailer frame.

Referring to the drawings, and more particulary to FIGS. 1 and 2 is shown the support of the invention S as typically mounted on a detachable trailer T. In FIG. 3 is shown the mounting plate 30 of the invention. The mounting plate 30 is welded to the frame of trailer T.

In FIG. 5 is shown a side view of the invention. The support S of the invention is pivotally attached to the mounting plate 30 by a hinge assembly. The hinge assembly is comprised of top plate 50 welded to the mounting plate 30, the hinge pin 52, and a lower plate 54 hingedly connected to top plate 50 and welded to the front face of the support S.

Continuing with FIG. 5, is shown the locking hasp 58 at the lower end of the support S. The support S is pivoted around hinge pin 52 until hasp 58 is in proximity to hasp 56 on the mounting plate. A conventional lock can then be used to lock the support S in this horizontal storage position.

Figure 4:
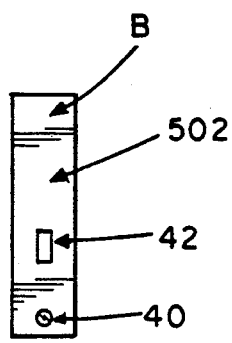
FIG. 4 is a front view of the backing brace of the invention.

On the back of support S is attached locking staple 500. When support S is pivoted to its vertical position, staple 500 passes through the opening in the backing brace assembly 42 shown in front view in FIG. 4. A conventional lock or other suitable locking means can now be used to lock the support S in its vertical trailer support position.

The backing brace B is a triangular assembly welded perpendicular to mounting plate 30, and with forward member 502 which abuts the support S when the support S is pivoted to its fully deployed vertical position and thus prevents the support from pivoting further, that is the brace B limits the degree of pivot of the support S to 90 degrees. Backing brace B is comprised of mounting plate 30, forward member 502, and two parallel spaced apart triangular gussets 301 and 302 which are welded or otherwise permanently secured to the lateral edges of mounting plate 30 and forward member 502.

Returning to FIG. 4, is shown the electrical switch 40 which is activated by contact with support S when support S is pivoted to its fully deployed vertical position. The switch is in electrical communication by conventional means, not shown, such as through the trailer wiring harness, with an indicator 41 readily visible from the passenger compartmemt of the towing vehicle.

Support S can be a unitary longitudinal member of sufficient length that in its fully deployed vertical position it will raise the trailer wheel, W in FIGS. 1 and 2, off the ground. Alternately, the support S can be an assembly as shown in detail in FIG. 6 comprised of an upper cylindrical member 60 and cylindrical member 62 telescopically disposed within and extensible below member 60. In this embodiment of the invention, therefore, the height of the trailer above the ground can be varied. Additionally, a single version of this embodiment of the invention can be mounted on a variety of styles and sizes of trailers.

In this embodiment, the length of the support is readily adjustable. The upper member 60 is slotted at its lower end, not shown. A holding pin 68 is inserted through one of the paired plurality of holes through member 62. Member 62 is then inserted into member 60, the holding pin 68 fitting into the slot at the lower end of member 60, until the holding pin 68 is covered by the holding pin covers 508 shown in FIG. 5 in side view and in FIG. 6 in front view.

As shown in FIG. 6 a spring 64 is disposed within the upper member 60 of the support and attachably connects the top inside surface of the member 60 and the top surface of lower support member 62. This prevents the two members of the support from becoming detached while adjustments are being made. Finally, a locking pin 600 is inserted through member 60 and through another of the paired plurality of holes in member 62. The locking pin extends beyond the periphery of member 60 and has a hole disposed through its extending end so that it can be secured by locking means such as a cable and lock ararangement.

The upper 60 and lower 62 members of the support are perferably cylindrical in configuration. However, it is readily apparent that they may be of any suitable configuration provided that lower member 62 is slidably extensible from upper member 60.

Once the length of the support S has been set, it cannot be tampered with by unauthorized personnel. Further, the length of the support can be set manually with simple tools and little manual effort as this operation is conducted in a non-weight bearing configuration while the support S is pivoted off the ground. This arrangement obviates the need for complex gearing arrangements and the physical effort required to adjust the support length of prior art "jack" type devices.

Of course, it will be readily apparent that other means for adjusting the length of the support are within the scope of the invention.

In FIG. 7 is shown a second embodiment of the pivoting mechanism whereby the support S pivots in relation to the mounting plate 30. In this embodiment, side supports 70 are mounted perpendicular to the mounting plate 30. Shaft 74 is supported at its ends by the side supports 70 and passes through a recess at the upper end of support S whereby support S is pivotally supported by the shaft and bearing arrangement. This embodiment, therefore, has increased load bearing capacity over the hinge arrangement shown in FIG. 5 and can be used for heavy duty applications.

Returning to FIG. 6, is shown a front view of ground engaging foot 66 at the lower end of support S. The foot 66 can be of conventional spiked configuration for engaging earth or other soft surfaces or can be alternately configured as a non-skid surface such as with a covering of rubber like material for engaging hard surfaces such as concrete. The dimensions and construction of the foot 66 must be adequate to support the weight of the trailer. The foot is designed to engage the ground with sufficient adhesion so that it will not readily move relative to the ground.

In FIGS. 1 and 2 is shown the operation of the invention. When the support S of the invention is to be deployed, it is unlocked, at 58 and 56 as shown in FIG. 5, and as shown in FIG. 1, is allowed to drop into ground engagement. The towing vehicle V then is used to pull the trailer T against the support S. The support S is constrained from moving relative to the ground because of the design of its ground engaging foot 66, shown in FIG. 6. The trailer T, therefore, will cause support S to pivot into its fully deployed perpendicular position and to abut the backing brace B as shown in FIG. 2. The length of the support S is such that the wheel W of the trailer is now suspended off the ground. In case of the embodiment where the support assembly S is comprised of telescoping elements 60 and 62, as shown in FIG. 6, the length of the support has likewise been preset to this required length and can be left permanently at this setting unless a change is desired.

The support S is now locked to the brace B by locking means as discussed above. The detachable trailer is now supported exclusively by the support of the invention and cannot be moved until the support is unlocked.

In another embodiment of the invention the supports are provided with separate securing and locking means. For example, removable pins could be inserted through hasp 500 and hasp 58 instead of the locks described above. Therefore, if it is desired to deploy and secure the support of the invention but anti-theft protection is not needed, the securing means alone may be used.

To provde anti-theft protection, it is only necessary that one of the supports of the invention be provided proximate to one of the rear wheels of the trailer. Two of the supports of the invention can be used if it is desired to symmetrically support a trailer, one directly in front of each of the two rear wheels. Of course, additional numbers of the invention may be employed to accommodate various trailer sizes and configurations. For example, a support of the invention can be mounted on the trailer tongue of a boat hauling type trailer so that the trailer is supported by three of the supports of the invention when the trailer is detached from the towing vehicle. For a trailer with an extended rear, the supports of the invention can be mounted behind the rear wheels. In such a case, the invention can also be mounted in a reversed configuration from the embodiment illiustrated above. In operation, therefore, the invention would be deployed by using the motor vehicle to back the trailer against the ground engaging support rather than using the vehicle to tow the trailer forward as shown in the embodiment above.

Additionally, the supports of the invention could readily be used on a self-propelled vehicle such as a typical recreational vehicle where stable support and anti-theft protection is desired at rest. Of course, the supports of the invention could not be deployed by the above described method if located proximal to the driven wheels of the self-propelled motor vehicle. Therefore, it is envisioned that for a self-propelled motor vehicle, supports of the invention would be disposed proximal to the non-driven wheels alone or in combination with other types of support devices proximal to the driven wheels.

The supports of the invention may be fabricated of commercially available materials, and by known methods of fabrication resulting in a structure of sufficient strength and rigidity to provide stable support for a trailer and to be able to withstand the load requirements encountered in operation according to the method of the invention.

It is to be understood that the present invention is not limited to the sole embodiments described above, but encompasses any and all embodiments within the scope of the following claims.

I claim:

1. A theft deterrent support assembly for use in combination with a land vehicle resting upon a surface, said supporat assembly comprising;
   a generally horizontal mounting plate permanently affixed to an underside of said land vehicle,
   a vertically depending member transversely attached thereto and having a passage therethrough,
   said mounting plate and depending member defined by two generally parallel lateral edges,
   two substantially parallel backing braces extending between and adjoining each said mounting plate lateral edge and corresponding depending member lateral edge and thereby defining an included space therebetween,
   said mounting plate providing for the pivotal attachment of one end of a support strut,
   said support strut defined by one end providing said pivotal attachment and an opposite distal end,
   said support strut having a staple extending therefrom and cooperating with said depending member passage when said support strut is pivoted to an extended position adjacent said depending member,
   said support strut distal end having a hasp attached thereto and cooperating with securing means on said mounting plate,
   said distal end hasp and said mounting plate securing means providing security for said support strut when said support strut is in a stored position,
   said support strut providing a length between said pivoted end and said distal end which is greater than the distance between said land vehicle underside and said surface,
   said support strut pivotable from said stored postion to said extended position,
   said extended position providing support for a portion of said land vehicle and capable of lifting at least one wheel of said land vehicle clear of said surface,
   said support strut staple extending through said depending member passage and providing for securing by securing means when said support strut is in said extended position, whereby
   said securing means is protected from tampering and damage by said included space provided by said parallel backing braces.
2. The support assembly of claim 1 wherein;
   said securing means comprises a locking device.
3. The support assembly of claim 1 wherein;
   said support strut contains a limit switch interconnected therewith, whereby
   said limit switch provides a warning signal when said support strut is in said extended position and contacts said limit switch.
4. The support assembly of claim 1 wherein;
   said support strut includes an upper tubular member pivotally attached to said mounting plate,
   said upper tubular member containing a lower member telescopically disposed within said upper member and having adjusting means providing adjustment of the length of said support strut.
5. The support assembly of claim 2 wherein;
   said adjusting means includes a plurality of lateral passages through said upper and lower members and at least one cooperating securing pin capable of passing through said lateral passages.
6. The support assembly of claim 2 wherein;

said upper tubular member has extensions providing for the containment of said securing pin therebetween, thereby preventing removal of said securing pin when said strut is extended.

7. A method of protecting a land vehicle resting upon a surface against theft, the method including the following steps:

securing a support assembly to the underside of said land vehicle, pivoting a support strut from said support assembly so that one end of said support strut is resting upon said surface, providing a backing brace for said support strut, thus preventing said support strut from pivoting to a position substantially past vertical when extended, providing said support strut with a length greater than the distance between said land vehicle underside and said surface, maneuvering said land vehicle in a direction causing said support strut to be urged to a substantially vertical position whereby at least one wheel of said land vehicle is lifted clear of said surface, securing said support strut in said substantially vertical position, providing said support strut with a limit switch capable of providing a warning signal when said support strut is moved to a substantially vertical position and contacts said limit switch, maneuvering said land vehicle in a direction causing said support strut to be urged to a substantially vertical position, and said limit switch providing said warning signal alerting that said support strut has reached said vertical position.

8. A method according to claim 7 further including the steps of;

telescopically adjusting said support strut length, thereby providing for said length greater than said distance between said land vehicle underside and said surface.

* * * * *